No. 896,438.  
PATENTED AUG. 18, 1908.  
F. B. COMINS.  
PRESSURE REGULATING SYSTEM.  
APPLICATION FILED DEC. 26, 1907.
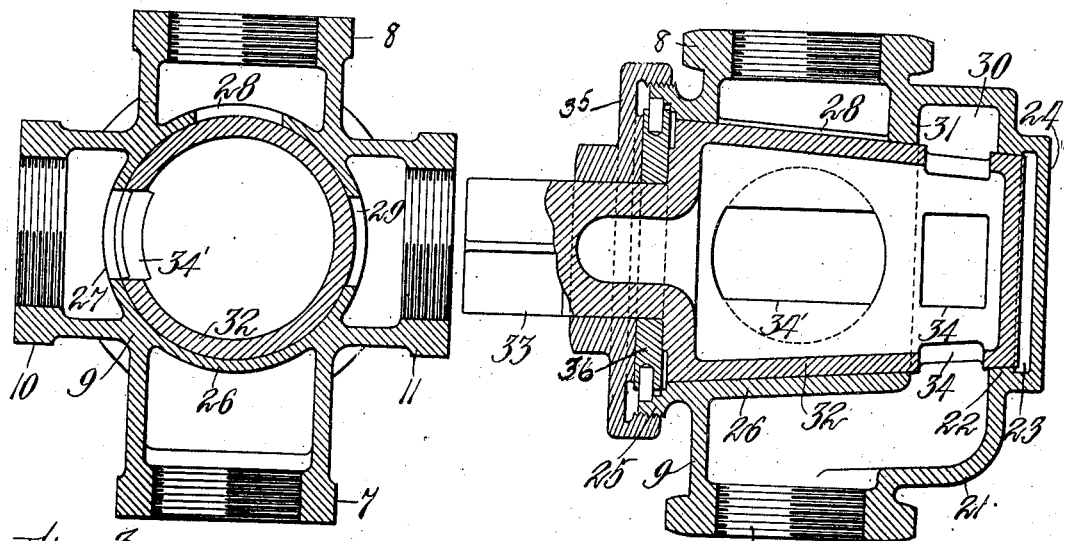
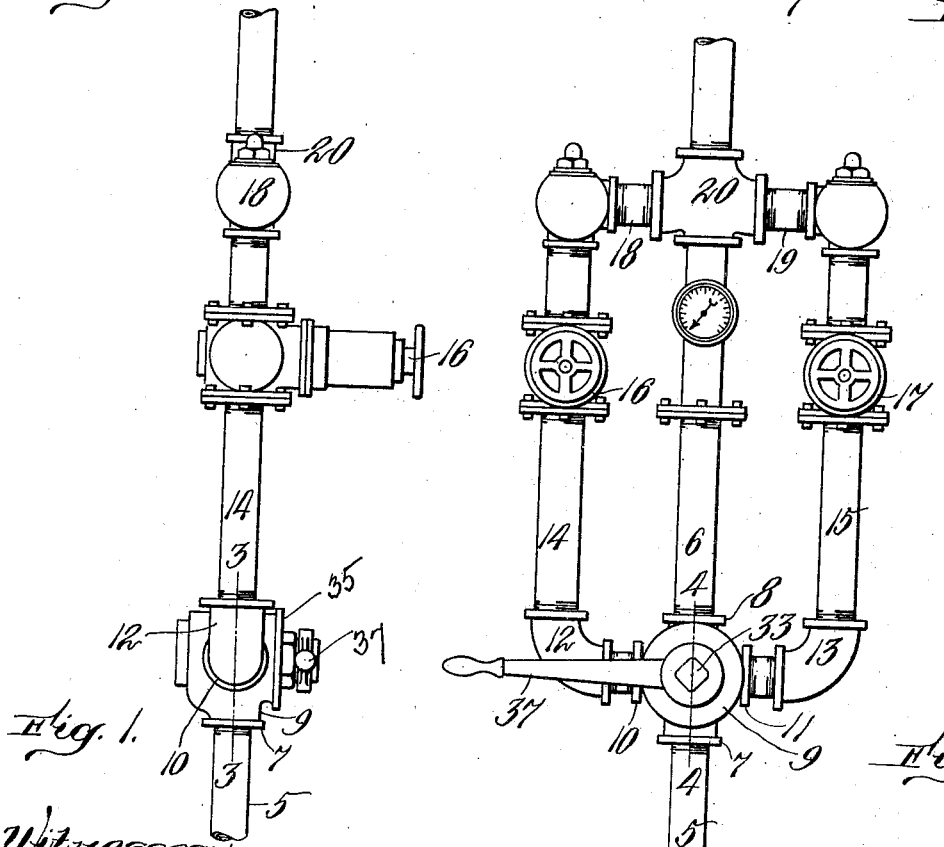

UNITED STATES PATENT OFFICE.

FRANK B. COMINS, OF SHARON, MASSACHUSETTS.

PRESSURE-REGULATING SYSTEM.

No. 896,438.   Specification of Letters Patent.   Patented Aug. 18, 1908.

Application filed December 26, 1907. Serial No. 408,129.

*To all whom it may concern:*

Be it known that I, FRANK B. COMINS, of Sharon, in the county of Norfolk and State of Massachusetts, have invented certain new and useful Improvements in Pressure-Regulating Systems; and I hereby declare that the following is a full, clear, and exact description of the same, reference being had to the accompanying drawings, forming part of this specification.

This invention relates to improvements in pressure regulating systems for fluid supply pipes or mains.

The object of the invention is to so construct a fluid pressure regulating system that the pressure in the delivery pipe may be changed when desirable from the main pressure to any one of several reduced pressures, and to automatically control said reduced pressure.

The invention consists in a main supply leading to a delivery system, and a series of branch pipes all connected with the main supply and with the delivery and having pressure reducing valves, and a single valve controlling the flow from the main supply to the delivery pipe and to the pressure reducing pipes.

The invention also consists in such other novel features of construction and combination of parts as shall hereinafter be more fully described and pointed out in the claims.

Figure 1, represents a side view of the improved pressure regulating system. Fig. 2, represents a front elevation of the same. Fig. 3, represents an enlarged sectional view of the controlling valve and its casing taken on line 3—3 Fig. 1. Fig. 4, represents a sectional view of said valve and its casing taken on line 4—4 Fig. 2, part of the valve stem being shown in full.

Similar numbers of reference designate corresponding parts throughout.

This improved system for regulating pressures of fluid supplies comprises a supply main 5 and a delivery main 6 connected respectively with the branches 7 and 8 of a valve casing 9 having the lateral branches 10 and 11 and furnished with any well known four way controlling valve, so called, of which one form will hereafter be described. The branches 10 and 11 are respectively connected by the elbows 12 and 13 with the pressure reducing branch pipes 14 and 15 each of which is furnished with a pressure reducing and regulating valve 16 and 17 and is connected beyond its said valve with the delivery main 6 by the respective return connections 18 and 19 and the branch fitting 20.

As shown herein in its preferred form the valve casing 9 has the wall 21 having the annular conical seat 22 and the pocket 23 formed by the end 24 of the wall 21. The screw threaded flange 25 of the casing 9 embraces the outer end of the annular conical bearing sleeve 26 which is integral with the outlet branches 7, 10 and 11 and extends inward beyond said branches and is furnished with the outlet ports 27, 28 and 29 corresponding in location respectively to the outlets 7, 10 and 11. Between the inner end of this sleeve 26 and the seat 22 is the channel 30 which is separated from the outlets 7, 10 and 11 by partitions as 31, Fig. 4.

The valve comprises a hollow plug 32 frusto conical in shape to closely fit the seats 22 and 26 and having the stem 33 and the inlet ports 34—34 which, when the valve is in position register with the channel 30, and the single outlet 34' of larger area than the inlet ports 34—34 and designed to be brought into registration with either of the outlets 27, 28 or 29 by the rotation of the valve or, when desired, to be brought opposite a closed portion of the sleeve 26 to shut the valve. The valve 32 is secured in its bearing sleeve by means of the screw cap 35 which has a bore through which the valve stem 33 extends and is designed to screw on to the flange 25 and to press and hold inward the plate 36 and any packing located between said parts. The valve stem 33 is furnished with the lever 37 preferably extending in the same general direction as the port 34'.

The valves 16 and 17 are preferably set, in the usual manner to regulate the pressure of the fluid beyond said valves automatically. If the pressure in the main 5 is approximately one hundred pounds the valve 16 is preferably set to regulate a pressure of about forty pounds and the valve 17 is set for a pressure of approximately twenty pounds. When the lever 37 is swung downward in line with the main 5 the valve 32 is rotated to bring the port 34' opposite the closed wall of the sleeve 26 and said port is thus closed. If now the lever 37 is swung upward in line with the delivery pipe 6 the port 34' is brought into registration with the outlet 28 of said sleeve 26 and fluid is free to pass to the delivery pipe 6 under the normal pressure. With the valve 32 rotated by means of the lever 37 to bring the port 34' into registration with the outlets 27 or 29 respectively the flow of fluid is directed through the pipes 14 or 15, as the case may be, and such fluid returns to the pipe 6 above the fitting 20 under the pressure regulated by the pressure reducing valves 16 or 17.

The valve herein specifically described does not necessarily form part of the present invention and any other suitable controlling valve may be substituted therefor if desired.

Having thus described my invention I claim as new and desire to secure by Letters Patent—

A pressure regulating system comprising a valve casing having an inlet branch and three outlet branches, a valve rotatably mounted in said casing for controlling the flow of fluid from the inlet to any one of said outlets, a supply pipe connected to said inlet, a delivery pipe connected to one of said outlets, branch pipes connected with the other outlets of said valve casing and with the delivery pipe, and pressure reducing valves connected with said branch pipes and respectively set for different pressures.

FRANK B. COMINS.

Witnesses:
CHARLES B. CUMMINGS,
HENRY J. MILLER.